ERROR DETECTING DEVICE
Filed Feb. 8, 1954
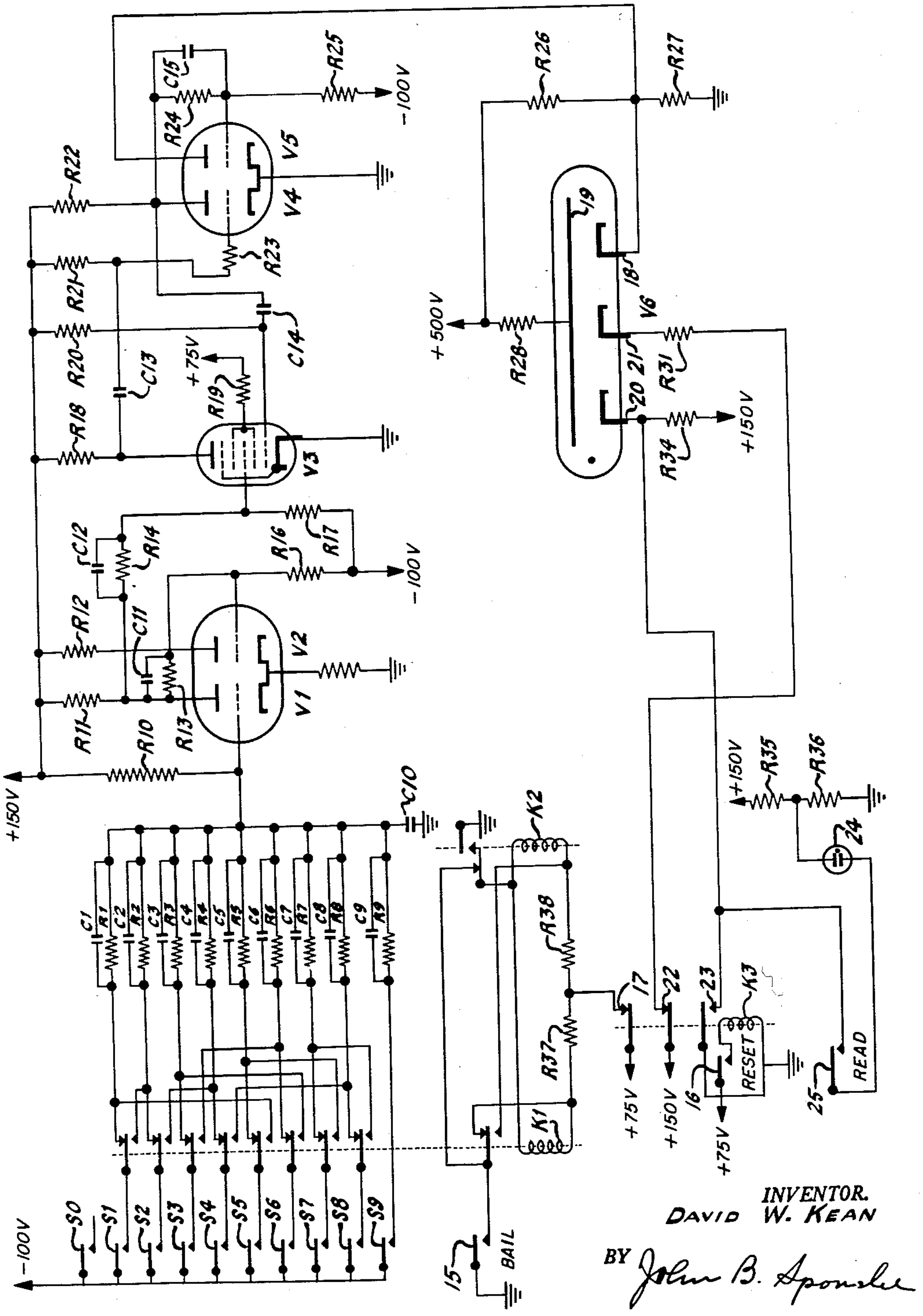
INVENTOR.
DAVID W. KEAN
BY John B. Sponsler
AGENT 2,974,864

ERROR DETECTING DEVICE

David W. Kean, Sunnyvale, Calif., assignor to International Business Machines Corporation, New York, N.Y., a corporation of New York Filed Feb. 8, 1954, Ser. No. 411,197

6 Claims. (Cl. 235—153)

The present invention appertains generally to error detecting devices and relates more particularly to devices for indicating to a key-board operator whether or not he has keyed a piece of information correctly.

It is an object of this invention to provide an improved apparatus for denoting the correctness of keyed data.

Another object is to provide a versatile keyboard checking device which may be readily adapted for use with a variety of different types of installations.

These and other objects and advantages will become apparent from the following detailed description taken in connection with the accompanying schematic drawing: which depicts the novel structure of the invention.

The present invention is a device for indicating to a keyboard operator that he has made either a "single number" and/or a "transposition" error while keying numerically coded information into any machine such as a printer, a punch, etc. It should be noted in this connection that, while present structure is adapted only to check the correctness of numerically coded information, the same principles may be applied to check alphabetic information. This device permits detection of 90% of all transposition errors and 100% of all single number errors.

It is well known that single number errors in a code group may be detected by providing the code group with an additional "key digit," which digit is the complement of the sum of the digits which precede it in that group. When using this system, the cross-sum of the digits in the code group, plus the key digit, equals zero, when the tens are cast out, if the group has been keyed correctly.

Transposition errors cannot be detected by this method, however, since the cross-sum of a code group is not altered by an error of this type. To permit the detection of transposition errors, digits may be systematically substituted for alternate digits of the code group, and a key digit, the complement of the sum by cross-addition of the substitute group, is added to the original code group. Although other equally suitable tables of values to be substituted for the alternate digits can be devised, the following table is suggested and is utilized in the present invention:

| | | | | | | | | | | |
|---|---|---|---|---|---|---|---|---|---|---|
| Actual Numbers | 0 | 1 | 2 | 3 | 4 | 5 | 6 | 7 | 8 | 9 |
| Substitute Numbers | 0 | 2 | 4 | 6 | 8 | 1 | 3 | 5 | 7 | 9 |

In the present embodiment the key digit is derived by replacing the digits in even numbered columns, i.e., the second, fourth, sixth, etc., in the original code group with the corresponding above identified substitute digits, cross-adding the result, casting out tens, and substracting the sum from ten. For example, suppose a code group to be 542306. Referring to the above table, the substitute group would be 582603. The cross-sum, after casting out tens, would be 4 and the key digit would be 6. Thus, the code group keyed by the operator would be 5423066.

The equipment to be described herein performs the inverse process to the above and determines thereby whether the code group and key digit, as keyed by the operator, has been keyed properly under the established rules. As the operator keys in a code group, the second, fourth, etc., digits are automatically replaced by the above described substitute digits and a counter determines the cross-sum of the revised code group, including the key digit, casting out tens in the process. Means are provided for then indicating whether or not the sum by cross-addition equals zero, i.e., whether or not the code group was correctly keyed. It will be noted that, when a code group having an odd number of digits, exclusive of the key digit, is entered into the machine of the invention, the key digit is replaced by its corresponding substitute digit since it is located in an even numbered column. In the case of code groups having an odd number of digits, therefore, it is necessary to supply a code group with a substitute key digit. This may be accomplished by replacing a key digit derived as above described with a digit having a corresponding substitute digit which is equal to the derived key digit. For example, suppose a code group to be 37521, the key digit is 2. If the code group 37521–2 is correctly keyed into the machine, the 2 is replaced by a 4 and the machine will indicate that the group was incorrectly keyed. However, if the key digit added to the code group is a digit having a substitute digit equal to the derived key digit, then the machine will operate correctly and, when the number 37521–1 is correctly keyed into the machine, the machine will so indicate, the suffixed "1" being the substitute key digit in this instance.

Referring to the drawing, ten switches, S0, S1, S2, etc., are operatively associated with a numerical keyboard (not hown), the correctness of operation of which is to be checked by the mechanism of the invention. Each of these switches may be actuated in any convenient manner to close upon depression by the operator of the corresponding key. Nine parallel R–C circuits are each serially connected between the control grid of a vacuum tube V1 and one side of the corresponding switch S1 to S9 inclusive through the several contacts and armatures of a relay K1, substantially as shown. The other sides of the switches S are connected to a negative 100-volt line. Each of the R–C circuits, R1—C1 through R9—C9, has a specific, predetermined time constant, for a purpose to become clear hereinafter. It should be noted that, when a key other than the zero key is depressed by the operator and the relay K1 is in the position shown, the associated switch S is closed and a negative pulse is applied through the corresponding R–C circuit to the control grid of V1. When relay K1 is energized, however, the negative pulse is applied to the control grid of V1 through a substitute R–C circuit, as is defined by the above table of substitution.

It will be recalled that the second, fourth, sixth, etc., digits are replaced by substitute digits to permit detection of errors by transposition. Every second digit keyed by the operator is converted into a substitute digit, and the manner in which this is accomplished will now be explained. A two-pulse counter comprising relays K1 and K2 is controlled by a bail contact 15 which is operable to close each time one of the switches S is closed. Before a code group is keyed, the relays K1 and K2 should be in the positions shown in the drawing. To insure this, a reset key 16 is provided. When the key 16 is depressed, relay K3 is energized, thereby opening contacts 17 thereof, and relays K1 and K2 are disconnected from the 75-volt supply, thus permitting relays K1 and K2 to assume their normal, de-energized positions, as shown in the drawing. The reset key is then released, and the first number keyed in by the operator causes the bail contact 15 to close, grounding one side of the windings of each of the relays K1 and K2. Only K2 is energized, however, since the relay K1 is shunted by its own back contact. When the bail 15 is opened, K2 remains operated as a result of its locking path to ground, and relay K1 is energized from the locking ground of K2 since K1 is no longer shunted by the bail ground. The next number entered by the operator again closes the bail 15 and shunts relay K2, thereby deenergizing it. Relay K1 remains energized, since it is grounded through the K2 contacts, until the bail 15 is again opened. At this time relay K1 is de-energized and the circuit is in its normal state. Further pulses actuate the relays as just described, the circuit returning to normal after every even numbered pulse. Thus, it should be clear that upon entry of every second pulse relay K1 is energized and a negative pulse is applied through the proper substitute R-C circuit to the grid of V1.

A Schmitt trigger, comprising vacuum tubes V1 and V2, is provided to create a timed, substantially square, positive pulse each time one of the switches S1 through S9 is closed. The operation of the Schmitt trigger is well known, and a comprehensive description thereof is deemed unnecessary. (For a more complete description, reference may be made to the book entitled "Time Bases" by O. S. Puckle, 2nd edition.) It is sufficient, for the purpose of this description, to say that, when one of the switches S1 through S9 is closed, the negative pulse applied through the corresponding R-C circuit to the control grid of V1 will bias the normally conducting V1 below cutoff. The characteristic of the Schmitt trigger is such that the plate voltage of V1 will rise rapidly upon the application of the negative 100-volt pulse and, when the pulse is dissipated to the extent that V1 commences to conduct, the plate voltage will drop rapidly to its normal state, thereby providing the desired pulse.

The pulse taken from the plate of V1 is utilized at gate an a stable multivibrator comprising vacuum tubes V3 and V4. V3 is normally non-conducting due to the negative bias present on the number 3 grid thereof. The amplitude of the positive trigger pulse applied to the number 3 grid from the plate of V1, however, is sufficient to cause the tube to conduct and to the thereby permit the multivibrator to oscillate. When the pulse terminates, V3 is again cut off and oscillations cease, the number of oscillations occurring being determined by the duration of the trigger pulse applied to the number 3 grid of V3. The resulting positive pulses taken from the plate of V4 are fed to the control grid of an amplifier V5, the plate of which is connected directly to the intermediate cathodes 18 of a gas tube counter V6. A detailed description of the structure and operation of such a tube may be had by referring to U.S. Letters Patent No. 2,621,313.

In brief, the operation of the gas counter tube V6 may be described as follows: A glow, which may be defined as a conducting, ionized path between a cathode and the plate 19, is present between only one of either the digital or intermediate cathodes and the plate at any one time. When the tube is in zero position, a glow is present between the zero digital cathode 20 and the plate 19. If a negative pulse is applied to the intermediate cathodes, the glow is advanced past an intermediate cathode to the first digital cathode. (The digital cathodes, one through nine, are connected together and are represented by a single cathode 21.) Similarly, three more negative pulses, for example, will advance the flow from the first to the fourth digital cathode. When the glow extends between the ninth digital cathode and the plate, another input pulse will return it to the zero cathode, etc. If the glow is on the zero cathode, the potential thereof is higher than when the glow is not present thereon, due to resistance R34 in series therewith, and this potential difference is utilized to indicate the correctness of the keyed code group, as will be more fully explained in the text to follow.

Circuit parameters for the embodiment of the invention herein described are as follows (these values are only exemplary and are in no way to be construed as the only values by which the invention may be defined):

Resistances in kilo-ohms:

| | |
|---|---|
| R1 and R6 | 270 |
| R2 | 390 |
| R3 and R25 | 200 |
| R4, R9 and R24 | 150 |
| R5 | 135 |
| R7 | 220 |
| R8 | 160 |
| R10, R16, R20 and R21 | 100 |
| R11 | 22 |
| R12 | 10 |
| R13 and R28 | 68 |
| R14 | 390 |
| R15 | 4.7 |
| R17 and R19 | 470 |
| R18 and R22 | 18 |
| R23, R37 and R38 | 1 |
| R26 and R32 | 750 |
| R27 and R34 | 510 |
| R29, R30, R31 and R33 | 36 |
| R35 | 130 |
| R36 | 300 |

Condensers in microfarads:

| | |
|---|---|
| C1 and C10 | .1 |
| C2, C3, C4 and C5 | .02 |
| C6, C7, C8 and C9 | .05 |
| C11 | .00004 |
| C12 | .0001 |
| C13 | .01 |
| C14 | .007 |
| C15 | .00002 |
| V1, V2 and V4, V5 | GE 5844 |
| V3 | RCA 5915 |
| V6 | IBM 78 |

(It was found difficult to generate a stable 1-millisecond gate with the components chosen for this circuit, but since tens are cast out in the final analysis, eleven pulses are equivalent to one. Accordingly, the R1—C1 circuit is arranged to develop an 11-millisecond gate. Further effort could unquestionably remove this esthetically objectionable situation; however, for the purposes of this disclosure it is considered unnecessary.)

The frequency of the disclosed multivibrator is approximately 1 kc., and the number of pulses emitted thereby is controlled by the trigger circuit, as hereinbefore explained. The length of the gating pulse is determined by the time constant of the R—C circuit through which the cutoff bias to V1 is applied. The time constants for R2—C2, R3—C3, R4—C4, etc., through R9—C9 are arranged to cut V1 off for 2, 3, 4, etc. through 9 milliseconds, respectively, and the time constant of R1—C1 is arranged to cut V1 off for 11 milliseconds, thereby positively controlling the number of negative pulses applied to the input of the counter tube V6.

For the purpose of describing the operation of the device, it will be assumed that the code group to be keyed by the operator is 5423066. As explained earlier, the operator should depress the reset key 16 prior to entering a number, to return the two-pulse counter to its normal position. Additionally, it is necessary that the glow be on the zero cathode 20 before starting, and this is accomplished by lowering the voltage thereof relative to the potential of the digital cathodes 21. When relay K3 is energized by key 16, contacts 22 are opened, thus floating the digital cathodes, contacts 23 are closed, grounding the zero cathode, and thereby causing the glow to move to the zero cathode. When the key 16 is released, the number may be entered on the keyboard.

Upon depression of the five key, a 5-millisecond pulse is provided to trigger the multivibrator and to thereby impose five negative pulses on the intermediate cathodes 18 of V6. The glow is advanced by the pulses from the zero cathode to the five cathode. Upon depression of the four key by the operator, relay K1 having been energized as explained earlier, an 8-millisecond negative pulse is applied to the grid of V1 and the glow on the five cathode of V6 is further advanced eight steps, past the zero cathode to the three cathode. Similarly, depression of the two key advances the glow to the five cathode; depression of the three key advances the glow to the one cathode; depression of the zero key has no effect; depression of the six key advances the glow to the four cathode; and, finally, depression of the six key (the key number) returns the glow to the zero cathode. Had the operator made a transposition error, for example, had he keyed 5432066 instead of 5423066, the glow in V6 would have finally appeared on the nine cathode instead of the zero cathode. If one of the numbers had been otherwise keyed incorrectly, the glow would have been left on one of the digital cathodes other than the zero cathode.

Returning now to the zero cathode 20 of V6, it will be noted that one side of a neon bulb 24, a G.E. NE-2 in this case, is connected thereto through a normally open "read" key 25, the other side of the bulb being connected intermediately of resistors R35 and R36. When the glow is on the zero cathode, the potential thereof is approximately 215 volts, due to the current flow through R34, and, if the "read" key is depressed, the potential across the neon bulb is sufficient to ignite it, since the potential at the juncture of R35 and R36 is in the neighborhood of 105 volts, the potential across the bulb being roughly 110 volts. However, should the glow appear on any cathode other than the zero cathode, there is no current flowing through R34, and upon depression of the "read" key there is insufficient voltage (150 volts minus 105 volts) across the neon bulb 24 to ignite it. It should now be clear that an operator may detect substantially all errors made by him while keying the code group merely by depressing the "read" key, since the bulb 24 will not light if the glow is not present on the zero cathode, i.e., if the cross-sum of the number does not equal zero after casting out tens.

While there have been shown, described and pointed out the fundamental novel features of the invention as applied to the disclosed embodiment, it will be understood that various omissions, substitutions and changes in the form and details of the device illustrated and in its operation may be made by those skilled in the art without departing from the scope and spirit of the invention. It is the intention, therefore, to be limited only as indicated by the following claims.

What I claim is:

1. In an error detecting device, the combination of a normally inoperative pulse generator, said generator being arranged to produce pulses at a predetermined frequency when operative, and means responsive to a control signal for rendering said generator operative for a first period of time corresponding to the identity of the control signal, said means being alternately responsive to successive similar control signals to render said generator operative for a second period of time whereby successive similar control signals render said generator operative for different periods of time.

2. In an error detecting device, the combination of a pulse generator which may be turned on or off, said generator being normally off but arranged to produce pulses at a predetermined frequency when on, control means for turning said generator on, said control means comprising a plurality of timing circuits, each of which is adapted, when actuated, to render said control means operable to turn on said generator for a predetermined period of time dependent upon the particular timing circuit actuated, means for selectively actuating each of said timing circuits in response to the selection of a particular key of a keyboard, and means for changing the particular timing circuit actuated by the selection of a particular key upon successive key selections.

3. A device for indicating whether or not a code group has been correctly entered into a machine, comprising a normally inoperative means for generating pulses, an input switching means, means for counting pulses, means under the control of the input switching means for rendering the pulse generating means operative for a selected time interval and thereby selectively entering pulses into said counting means, said mounting means being operable to count only the least significant order of digits of the sum of the pulses entered therein, and means for indicating whether or not the least significant digit is equal to a predetermined quantity, whereby equality indicates that the code group has been entered correctly.

4. A device for indicating if data is entered into a machine correctly, comprising an input switching means, a normally inoperative pulse generator arranged to produce pulses at a predetermined frequency when operative, means responsive to the input switching means for rendering said generator operative for a period of time corresponding to the identity of the entered data, said means being alternately responsive to the input switching means for successive entry of similar data to render said generator operative for a second period of time, means for determining the sum of the pulses generated in response to entered data, and means for indicating a lack of correspondence between said sum and a fixed quantity associated with the entered data, whereby such an indication denotes that the data was entered incorrectly.

5. A device for checking the correctness of data as entered into a machine wherein said data corresponds to a predetermined number of pulses comprising an input switching means for receiving the data, means for counting pulses, a normally inoperative means for generating pulses, means responsive to the input switching means and controllably associated with the pulse generating means for rendering the pulse generating means operative for time intervals required to enter a number of pulses corresponding to the entered data into said counting means, and means for indicating correspondence between the sum of the pulses entered in said counter and said predetermined number of pulses, whereby a correspondence indicates that said data has been entered correctly.

6. In a device for checking the correctness of numerical code groups as entered into a machine having an input switching means wherein the cross-sums of the code groups are equal to a predetermined quantity, the combination comprising a normally inoperative means for generating pulses, means for counting pulses, means under the control of the input switch means for rendering the pulse generating means operative for selected time intervals and thereby entering a number of pulses corresponding to the cross-sum thereof into said counting means, and means for indicating whether or not the sum of the pulses entered in said counting means corresponds to said predetermined quantity, whereby the correctness of entered code groups is indicated.

References Cited in the file of this patent

UNITED STATES PATENTS

| | | |
|---|---|---|
| 1,498,544 | Fowler | June 24, 1924 |
| 2,648,835 | Rench | Aug. 11, 1953 |
| 2,661,896 | Luhn | Dec. 8, 1953 |
| 2,765,982 | Knutsen | Oct. 9, 1956 |

UNITED STATES PATENT OFFICE
CERTIFICATE OF CORRECTION

Patent No. 2,974,864 — March 14, 1961

David W. Kean

It is hereby certified that error appears in the above numbered patent requiring correction and that the said Letters Patent should read as corrected below.

Column 2, line 36, for "hown" read -- shown --; column 3, line 38, for "at" read -- to --; line 39, for "a stable" read -- astable --; same column 3, line 68, for "flow" read -- glow --; column 6, line 11, strike out "a", second occurrence, and insert instead -- an input switching means, --; line 12, before "normally" insert -- a --; same line 12, after "pulses," strike out "an input"; line 13, strike out "switching means,"; same column 6, line 17, for "mounting" read -- counting --.

Signed and sealed this 19th day of September 1961.

(SEAL)
Attest:

ERNEST W. SWIDER
Attesting Officer

DAVID L. LADD
Commissioner of Patents

USCOMM-DC